United States Patent
Garay

(10) Patent No.: US 11,640,434 B2
(45) Date of Patent: May 2, 2023

(54) IDENTIFYING RESOLUTIONS BASED ON RECORDED ACTIONS

(71) Applicant: ServiceNow, Inc., Santa Clara, CA (US)

(72) Inventor: Ivan Garay, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 804 days.

(21) Appl. No.: 15/491,131

(22) Filed: Apr. 19, 2017

(65) Prior Publication Data

US 2018/0307756 A1 Oct. 25, 2018

(51) Int. Cl.
- *G06F 16/951* (2019.01)
- *G06N 20/00* (2019.01)
- *G06F 16/22* (2019.01)
- *G06N 5/00* (2023.01)

(52) U.S. Cl.
CPC ........ *G06F 16/951* (2019.01); *G06F 16/2246* (2019.01); *G06N 5/003* (2013.01); *G06N 20/00* (2019.01)

(58) Field of Classification Search
CPC .... G06F 16/951; G06F 16/2246; G06N 20/00
See application file for complete search history.

(56) References Cited

U.S. PATENT DOCUMENTS

| | | | |
|---|---|---|---|
| 6,609,122 B1 | 8/2003 | Ensor | |
| 6,766,307 B1 * | 7/2004 | Israel | G06Q 10/10 705/309 |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,904,753 B2 | 3/2011 | Athey et al. | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |

(Continued)

*Primary Examiner* — Ashish Thomas
*Assistant Examiner* — Dustin D Eyers
(74) *Attorney, Agent, or Firm* — Fletcher Yoder PC

(57) ABSTRACT

A system, method, and non-transitory computer-readable storage medium for identifying resolutions have been disclosed. The system comprises a server device including a memory, a processor, and a network interface. The memory includes instructions executable by the processor to cause the system to record a series of actions associated with a client device and to receive, from the client device, incident data of an incident that is associated with the series of actions. The memory further includes instructions executable by the processor to cause the system to query a database for resolution information based on the series of actions and the incident data and to transmit a message that includes the resolution information to the client device.

17 Claims, 9 Drawing Sheets

(56) References Cited

U.S. PATENT DOCUMENTS

| | | | |
|---|---|---|---|
| 8,478,569 B2 | 7/2013 | Scarpelli | |
| 8,674,992 B2 | 3/2014 | Poston | |
| 8,689,241 B2 | 4/2014 | Naik | |
| 8,738,972 B1 * | 5/2014 | Bakman | G06F 11/0712 714/47.1 |
| 8,743,121 B2 | 6/2014 | De Peuter | |
| 8,887,133 B2 | 11/2014 | Behnia | |
| 9,239,857 B2 | 1/2016 | Trinon | |
| 9,317,829 B2 | 4/2016 | Anand et al. | |
| 9,535,737 B2 | 1/2017 | Joy | |
| 9,792,387 B2 | 10/2017 | George | |
| 2006/0041869 A1 * | 2/2006 | Houston | G06F 11/0715 717/131 |
| 2007/0294258 A1 * | 12/2007 | Caldwell | G06Q 10/10 |
| 2008/0040750 A1 * | 2/2008 | Taylor | G11B 27/034 725/55 |
| 2009/0276728 A1 * | 11/2009 | Doan | G06Q 10/10 715/810 |
| 2010/0274596 A1 * | 10/2010 | Grace | G06Q 40/02 705/7.15 |
| 2010/0332474 A1 * | 12/2010 | Birdwell | G06K 9/6224 707/737 |
| 2014/0180738 A1 * | 6/2014 | Phillipps | G06Q 10/0631 705/7.12 |
| 2015/0012604 A1 * | 1/2015 | Lee | H04L 51/046 709/206 |
| 2015/0206427 A1 * | 7/2015 | Blandin | G08G 1/0129 701/117 |

* cited by examiner

IDENTIFYING RESOLUTIONS BASED ON RECORDED ACTIONS

TECHNICAL FIELD

This disclosure relates generally to identifying resolutions based on recorded actions.

BACKGROUND

Instances of software in a single-tenant or multi-instance environment can operate on behalf of different tenants or customers. During the normal course of operation and customization, these customer instances can experience a wide range of issues. When an issue is experienced, the customer can submit an incident report.

SUMMARY

Disclosed herein are implementations of systems, methods, and techniques for identifying resolutions based on recorded actions.

In an implementation, a system is provided for identifying resolutions. The system comprises a server device including a memory, a processor, and a network interface. The memory includes instructions executable by the processor to cause the system to record a series of actions associated with a client device and to receive, from the client device, incident data of an incident that is associated with the series of actions. The memory further includes instructions executable by the processor to query a database for resolution information based on the series of actions and the incident data and to transmit a message that includes the resolution information to the client device.

In an implementation, a method is provided for identifying resolutions. The method comprises recording a series of actions associated with a client device and receiving, from the client device, incident data of an incident that is associated with the series of actions. The method further comprises querying a database for resolution information based on the series of actions and the incident data and transmitting a message that includes the resolution information to the client device.

In an implementation, a non-transitory computer-readable storage medium is provided for identifying resolutions. The non-transitory computer-readable storage medium includes executable instructions that, when executed by a processor, facilitate performance of operations. The operations comprise recording a series of actions associated with a client device and receiving, from the client device, incident data of an incident that is associated with the series of actions. The operations further comprise querying a database for resolution information based on the series of actions and the incident data and transmitting a message that includes the resolution information to the client device.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
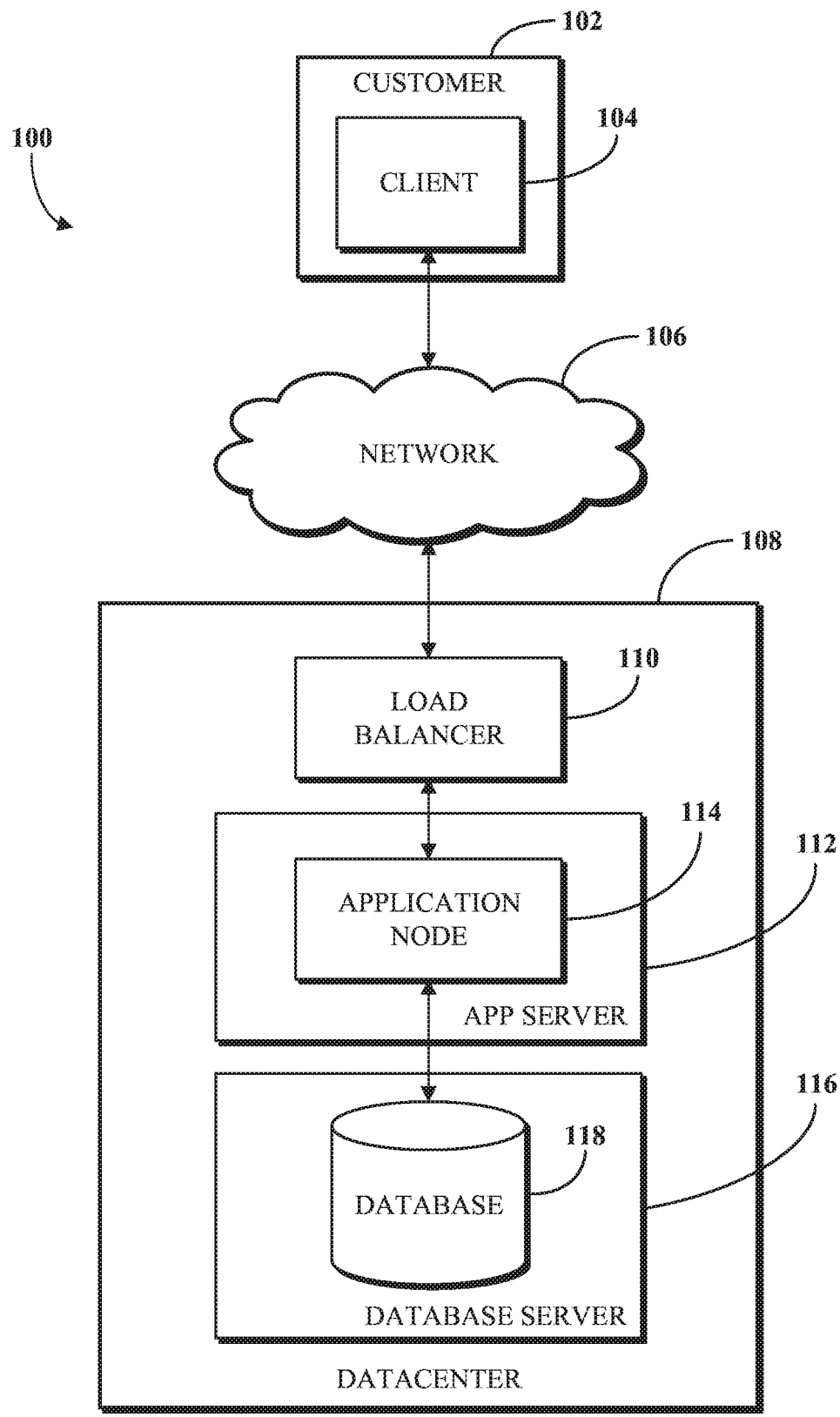
FIG. 1 is a block diagram illustrating an example of an electronic computing and communications system.

Customers of a computing (e.g., Platform-as-a-Service (PaaS)) provider can use or develop applications that operate on or using configurable platform software. An instance of the platform software can be implemented using one or more application nodes and database nodes, such as described later with respect to FIG. 1. For example, an instance of the platform software can include functionality relating to Information Technology Service Management (ITSM), Information Technology Operations Management (ITOM) or other business or enterprise related applications. Customers that use the instance may in certain circumstances, for example, encounter errors, undesired behavior, or unexpected behavior.

Such errors and behaviors can be referred to as an incident. An incident may also refer to an unplanned interruption to an IT Service or reduction in the quality of an IT service. Incidents may have associated incident data that relates to or describes characteristics of an incident. For example, incident data can include a timestamp of when the incident occurred, object identifiers and descriptions associated with the incident, information about a computing environment where the incident occurred, error types (i.e., the type of error associated with the incident or issue), or the like.

When a customer (e.g., by way of a client device, user, operator, etc.) experiences an incident or issue when using an instance (e.g., an instance of platform software in a single-tenant or multi-instance cloud computing infrastructure or platform), the customer can try to resolve the issue using his/her own prior knowledge. However, the customer may not have encountered a similar issue before. The customer can also try to search through a database (e.g., a system knowledge database that is local or remote) and associated materials for information on how to resolve the issue. Finding the correct data and information for issue resolution by searching a database may be difficult because the search parameters may not be narrow or specific enough to return relevant or desired results.

In addition, the customer can open an incident report via an incident management system (e.g., an ITSM system) to request assistance in resolving the issue. For example, an incident report can take the form of an incident record in an ITSM system. An incident record can, for example, be created by a user using a form associated with the ITSM system, automatically using an integration with the ITSM system, or combinations thereof. Incident records can have associated data used for managing instances, such as priority, criticality, assigned to (the person responsible for handling the incident), and the like. Incident reports can be costly and inefficient. Incident reports may also be not as effective because there can be a delay in between the time the report is submitted and the time the issue is resolved.

Current systems may result in growth of incident counts which may require additional engineers and support personnel to help resolve the incidents and issues. Accordingly, it may be difficult to organize all of the information, gather useful and pertinent solutions to related incidents across varying customers, and efficiently reuse the information.

More efficient incident or issue resolution may be achieved by tracking and recording the steps or user commands that led to a potential incident. By recording both the user commands that lead to an incident or issue and additional information related to the steps including but not limited to backend server-side transaction steps corresponding to the steps, the resolution of such incidents or issues may be improved, for example, by more efficiently preventing the creation of incident reports (by automatically presenting a relevant solution obviating the need for creation of an incident report), capturing more accurate information about the incident or issue to permit quicker and more accurate resolution, and enabling a more robust repository of data regarding incidents and issues. In addition, data and metrics can be collected regarding how instances are being utilized, how the incidents are occurring, and ultimately how the incidents are being resolved. The above referenced techniques, for example, can be implemented in platform software to permit the resolution of incidents or issues arising from the use of an instance of the platform software or applications using the platform software.

By providing such a system, customer confidence in the ability to receive accurate and customized information is bolstered, the customers can be directed to previously known and working resolutions/solutions, and/or incident deflection may be improved thereby reducing the overall red line or backlog of unresolved issues and the need for third-party assistance in the resolution of issues. Information is collected regarding what is working/not working, and instance usage. In addition, the customer does not need to recall the steps or user commands needed to reproduce the incident (i.e., a description of the steps taken before encountering the issue or incident) because an information collector (e.g., an information collector that can track and record actions comprising client-side or frontend user commands such as user interface interactions (e.g., click throughs) via a client device that is in communication with or connect to an instance and corresponding server-side or backend transaction steps) is included within the system, path to pain point descriptions can be formulated, organized (e.g., using a machine learning organizer or system), and stored in a database for easy lookup and reuse, associated areas corresponding to the incident can be categorized, and resolution options comprising related solutions (e.g., resolution options generated using the incidents and known errors and associated recorded data and information) are provided thereby streamlining the resolution process of the experienced incidents. For example, information regarding the incident or resolution options may be provided via a text box, chat box, pop up message, a new page or a different or combination of user interface elements.

Implementations of this disclosure may resolve these issues by recording certain usage information (e.g., actions comprising both user commands and transaction steps that are associated with a client device interfacing with a customer instance) and by processing incident data (i.e., data and information associated with an incident encountered during usage of the customer instance) to intelligently suggest resolution options to a client device before an incident/issue report or ticket is opened. The recording can be carried out by a part of a system (e.g., an information collector) that is within or part of the customer instance and in communication with the other external sub-systems of the system or server device. The system can include a server device that is in communication with the client device via the customer instance.

The system can record a series of actions including but not limited to client-side user commands (e.g., the user performing client device operations or user interface interactions including but not limited to page/button/link clicks) that lead to a "pain point" which can be defined as a clickable page element where the current incident occurred. Once the pain point or incident/issue is experienced, the user can be prompted or alerted to the occurrence of the error via a variety of mechanisms including but not limited to chat boxes, pop up messages, and new page redirections. In some implementations, the series of actions include backend server-side processes (e.g., sending/receiving query statements, other programmatic or code changes/updates) and thus not visible to the client device whereas the series of commands are frontend processes and comprise actions taken by the client device (e.g., selecting a dropdown option or clicking a button on a certain page of the customer instance).

The recorded information (i.e., including but not limited to the actions comprising user commands and corresponding transaction steps) and incident/issue data (i.e., data from both the client device and the server device associated with the incident encountered during usage of the customer instance, object identifiers, etc.) can be submitted along with a description of the current issue which can be collectively referred to as "pain to pain point information". The description can be manually entered or automatically entered based upon the path to pain point information.

In response to the server device receiving the series of actions (e.g., user commands and corresponding transaction steps) and incident data tracked and recorded by the customer instance (e.g., by an information collector of the customer instance), a database can be queried by the server device for resolution information related to other issues that are similar to the current issue. The actions that led to the occurrence of an incident can be referred to as path to pain point information. Therefore, the server device can provide resolution options for resolving the current issue based on the issue related information and historical information associated with the other issues. The historical information can include but is not limited to information regarding the client device and the customer instance, information regarding other client devices, and information regarding other customer instances. The historical information can also include information regarding the server device that is in communication with the client device or other server devices.

Once resolution information has been identified or generated, the resolution information can be sent back to the client device to resolve the issue. The incident or issue can be resolved automatically using the transmitted resolution information or can require manual implementation of the resolution information by the client device or third-party. The resolution information can be identified via a list of search results that is returned from the database query to provide the client device with recommendations (or resolution options) for resolving the current issue. If the list is empty or no list is returned because no applicable resolution options could be found, the client device could be redirected to a page on the customer instance to create and submit an incident report/ticket. The created incident report can include the path to pain related information and additional information that can be submitted.

In some implementations, the resolution information that is identified and transmitted to the client device for resolution of the current issue can be determined by comparing the pathways (i.e., path to pain points) taken by the client device up to the point that the issues occurred and the information associated with the pathways (e.g., user commands and corresponding transaction steps). The path to pain points can comprise all of or at least a portion of the information related to the reproduction of the issue which includes but is not limited to the path to pain point information including but not limited to the recorded actions (e.g., user commands and corresponding transaction steps), incident data including but not limited to error types, descriptions, and any additional information that is either recorded and/or submitted and utilized to identify/generate the resolution information.

In other words, the resolution information can be identified based on a comparison between the current incident and the other incidents that might have occurred at different time periods, the same or different client devices, and the same or different customer instances. The comparison can include but is not limited to determining whether at least one of the other incidents is associated with the same or substantially similar path to pain point in comparison to the path to pain point that the current incident is associated with. The comparison can also utilize machine learning techniques that analyze at least the path to pain point information and historical information. If the path to pain points are determined to be similar between the current incident and at least one of the other incidents, then resolution information that was previously provided in response to the at least one of the other incidents can be provided to help resolve the current incident.

For example, the system can record a first series of actions or steps leading up to a first incident. The data and information associated with the start of the first series of actions to the end (i.e., a pain point that coincides with the occurrence of the first incident) of the first series of actions provides a first path to pain point. The system can then record a second series of actions leading up to a second incident. Once again, the data and information associated with the start of the second series of actions to the end (i.e., another pain point that coincides with the occurrence of the second incident) of the second series of actions which coincides with the occurrence of the second incident provides a second path to pain point. If the first and second path to pain points were determined to be similar based upon a comparison mechanism and predetermined thresholds, the system could identify or generate resolution options (for resolution of the second incident) that have been previously identified or generated for resolution of the first incident.

Accordingly, implementations of the present disclosure may utilize a combination of information sources (e.g., path to pain point information comprising actions, descriptions, incident data, additional information, historical information, etc.) associated with an experienced incident to identify resolution information that can help resolve the experienced issue. The system can record the user commands and corresponding backend transaction steps (that make up the actions), incident data, and additional information regarding the steps that a client device takes prior to the occurrence of the incident or prior to reaching the area of the customer instance associated with the incident (i.e., a path to pain point). The path to pain point information can include but is not limited to the user/client-device commands and the corresponding transaction steps, communications, incident data, descriptions, client-device information, server-side information, customer instance information, and any combination thereof. The area of a user interface element generated and/or presented from the instance (e.g., a button) that is associated with the incident can be manually or automatically identified.

The additional information can include but is not limited to search terms, screenshots for image analysis, instructions, URL instance logs, reproduction steps, a transaction log of the beginning to the end of the reproduction steps, system analytics, performance analytics, precise customer instance elements associated with the issue, technical information, identification information such as a system id (sys_id), similar issues, known resolutions, results or feedback garnered from the implementation of previous resolution information. In some implementations, the additional information can be submitted or provided at a later time in regards to the resolution of a certain issue and after other issues are experienced in the interim. The additional information can also be provided to a third-party (e.g., technical support engineers) in conjunction with opening an incident report if resolution information cannot be determined.

In some implementations, feedback is generated based on the performance of the identified resolution information in regards to resolving the issue. If the resolution information completely resolves the issue, partially resolves the issue to a certain level (e.g., 25% resolution, 50% resolution, etc.), or does not resolve any part of the issue, this data can be recorded and utilized by the server device when dealing with the resolution of future issues. For example, a feedback loop mechanism is created based upon information related to the issue and information related to the resolution information or options associated with resolution of the issue.

In some implementations, resolutions associated with various incidents within a cloud computing infrastructure can be identified or generated. A system can include a memory and a processor that includes instructions to record actions associated with a client device in response to an indication or occurrence of an incident. The actions can be recorded in a predetermined series (e.g., track all actions from start to the pain point or incident occurrence) or a predetermined type (e.g., only track frontend client-side user commands and disregard the backend corresponding transaction steps). After the recordation of the actions, the system receives, from the client device, incident data of an incident that is associated with the series of actions, query a database for resolution information based on the series of actions and the incident data, and transmit a message that includes the resolution information to the client device.

Implementations of this disclosure provide technological improvements particular to computer networks, for example, those concerning the management of incidents. Computer network-specific technological problems, such as managing, troubleshooting, and repairing computing devices, tracking information related to incidents, making deflection of incident report creation more efficient, and organizing data for future reuse, can be wholly or partially solved by implementations of this disclosure. For example, information tracked and associated with particular incidents (i.e., path to pain point information) may be leveraged for resolving future related incidents in a more cost-effective, efficient, and streamlined manner. Implementations of this disclosure can thus introduce new and efficient improvements in the ways in which incidents, related to computer-networks and cloud computing systems, are resolved by recording information leading up to the occurrence of the incident.

Figure 2:
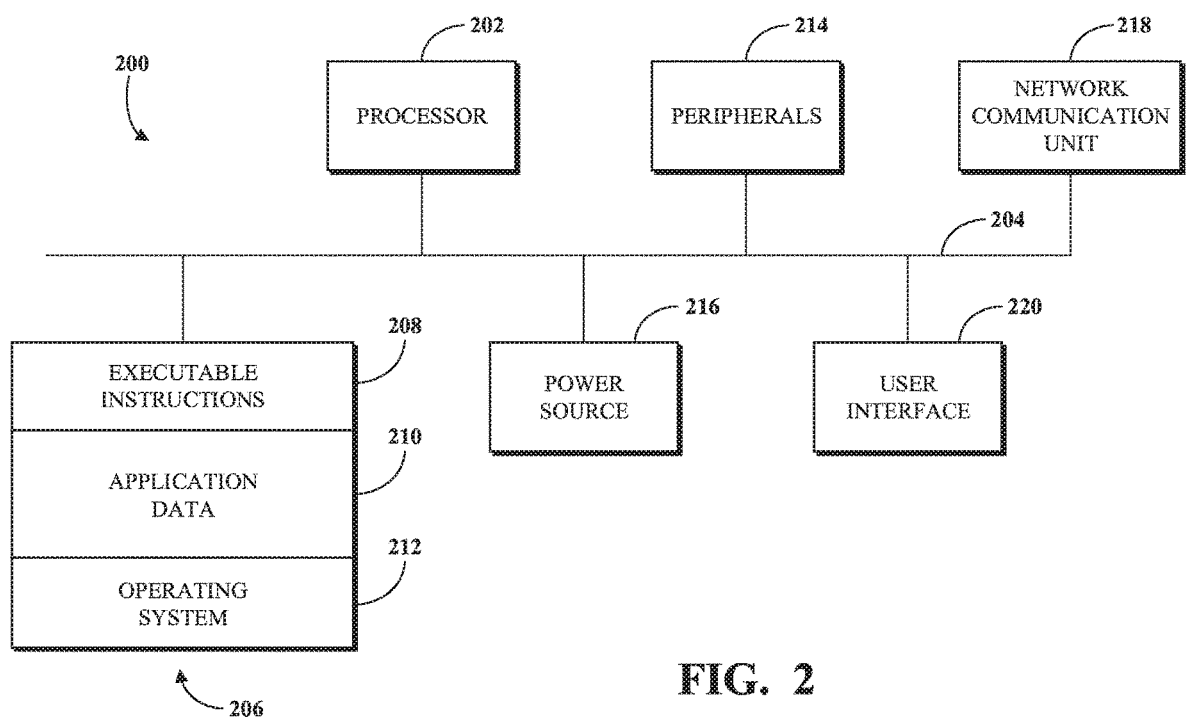
FIG. 2 is a block diagram illustrating an example of an internal configuration of a computing device of an electronic computing and communications system.

As used herein, the term "component" can refer to a hardware component (e.g., infrastructure, such as a switch, router, server, modem, processor, I/O interface, memory or storage, power supply, biometric reader, media reader, or the like, or combinations thereof) or a software component (e.g., software, such as a platform application, module, routine, firmware process, or other instructions executable by or in connection with one or more hardware components, or the like, or combinations thereof). A component can also refer to a computing feature such as a document, model, plan, socket, virtual machine, or the like, or combinations thereof. A component, such as a hardware component or a software component, can refer to a physical implementation (e.g., a computing device, such as shown in FIG. 2) or a virtual implementation (e.g., a virtual machine, container, or the like that can, for example, execute on a physical device and mimic certain characteristics of a physical device) of one or more of the foregoing. The terms "database" and "database node" may be interchangeably used herein to refer to a data structure for storing data associated with software, such as application software executing on one or more application nodes.

To describe some implementations in greater detail, reference is first made to examples of hardware structures. FIG. 1 is a block diagram illustrating an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database 118, which can be accessible by software executed on the application node 114. The database 118 may be implemented as a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, an access table configured to allow or deny requests to access components of the system 100 can be implemented on the application server 112, the database server 116, or the load balancer 110. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

FIG. 2 is a block diagram illustrating an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to generate records indicating that at least some of the application nodes within a distributed computing system (e.g., the system 100 shown in FIG. 1) are authorized to access at least some of the database nodes of the distributed computing system, store the records in an access table, receive a request to access a database node sent from an application node, determine whether the access table includes a record indicating that the application node is authorized to access the database node, and deny the request responsive to a determination that the access table does not include such a record.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

As aforementioned, a system for identifying resolutions associated with instance incidents is provided. Once an incident occurs, reproducing the actions and/or steps that were taken leading up to the incident can help provide data and information that can be utilized towards identifying resolutions for the incident.

Figure 3:
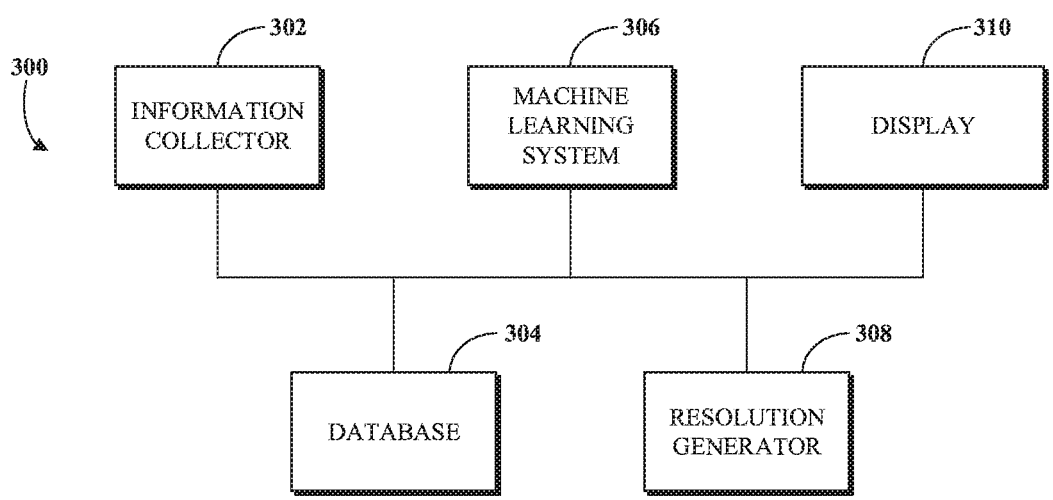
FIG. 3 is a block diagram illustrating an example system that identifies resolutions in accordance with implementations of this disclosure.

FIG. 3 is a block diagram illustrating an example system 300 that identifies resolutions in accordance with implementations of this disclosure. The system 300 includes at least an information collector 302, a database 304, a machine learning system 306, a resolution generator 308, and a display 310. In some implementations, the system 300 includes a server device, such as the datacenter 108 of FIG. 1 or the computing device 200 of FIG. 2, that includes a memory, a processor, and a network interface, wherein the memory includes instructions executable by the processor to implement the sub-systems 302-310 of the system 300. In another implementation, the system 300 includes a memory and a processor, wherein the memory includes instructions executable by the processor to implement the sub-systems 302-310 of the system 300.

The information collector 302 tracks and records the data and information associated with a series of actions (e.g., client-side user commands such as user interface interactions that can include but are not limited to click throughs and server-side transaction steps corresponding to the user commands) leading up to an incident or issue experienced by the customer instance. The information collector 302 can track and record both client-side information or the information associated with user commands interfacing with the customer instance via the client device (e.g., adding code or selecting a button) and server-side information corresponding to the user commands (e.g., the backend information or transactions associated with that selection of the button). The information collector 302 can be provided or embedded within the customer instance and/or the client device and coupled to the other sub-systems 304-310 that are external to the customer instance. For example, the customer instance can include the information collector 302 and the server device can include the sub-systems 304-310.

The data and information associated with the actions can include but are not limited to the user's commands (e.g., user interface interactions including but not limited to click throughs), and/or steps taken when interfacing and/or using the instance (i.e., commands or communications associated with the usage of the instance), the backend instructions and steps taken that are associated with the user's commands (i.e., transaction steps associated with or corresponding to the user's commands), the incident data associated with the user's commands and corresponding transaction steps that lead up to a potential incident or issue (which can include the type of error that the incident experienced can be tagged or labeled with), other data including but not limited to data regarding the customer instance, client device, and server device, and any combination thereof. For example, the data and information that is recorded can only include the user's commands or can include all of the information types based on system constraints, or can include different combinations of information types (i.e., if less constraints, more information can be recorded).

The database 304 can receive and store the data and information associated with the actions leading up to the potential incident (i.e., the path to pain point information). In addition, the database 304 can receive and store the potential resolution options received from and generated by the resolution generator 308. The database 304 can be queried for this resolution information when another incident similar to the potential incident arises.

The machine learning system 306 interfaces with the database 304 and utilizes data analytics and machine learning techniques to provide for the reorganization and updating of the data and information stored within the database 304. The reorganized data can be received and utilized by the resolution generator 308 to provide more accurate resolution option information. The display 310 receives the resolution options from the resolution generator 308 and other information associated with the incident and can display this information (or transmit the information as a message) to the user or a third-party administrator for the resolution of the incident. The display 310 can be a display including but not limited to the user interface 220 of FIG. 2.

For example, the display 310 can generate a graphical user interface (or a portion thereof) constituting data that reflects information ultimately destined for display on a hardware device, such as the client 104 of FIG. 1. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

As the user of the customer instance performs various commands that interface with the customer instance (e.g., clicking a button, loading up a specific page), these steps and any associated information (e.g., backend transaction steps) can be automatically tracked and recorded. These steps formulate a certain path and the paths can also be recorded in a database. In some implementations, the path or pathways are recorded in a tree-type data structure within the database. Once an incident occurs, this information can be submitted to the system for identifying and transmitting back resolutions (such as the system 300 of FIG. 3). The submission can be automatically submitted via the customer instance or can be carried about by the user or operator of the customer instance (e.g., client device) that experiences the incident.

In addition to the automatically recorded information associated with the user's steps or commands and the resulting path information, the user can also submit a description related to the path that was taken leading up to the incident. The description can also be submitted in a tree-type data structure with the path information. The corresponding description can also be automatically formulated by the customer instance or the system based on the received path data and information. The data and information associated with both the path and the associated description as well as the incident data related to the incident experience are utilized by the system (such as the resolution generator 308 of the system 300 of FIG. 3) to generate the potential resolution options.

Figure 4:
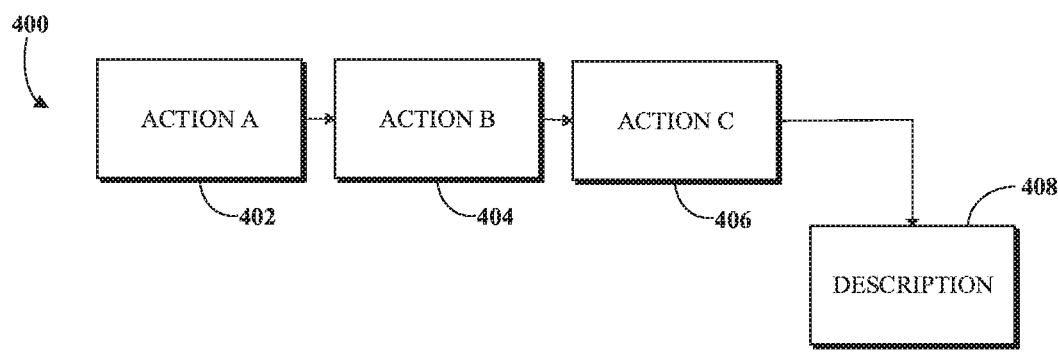
FIG. 4 is a flowchart illustrating the collection of path and description information in accordance with implementations of this disclosure.

FIG. 4 is a flowchart 400 illustrating the collection of path and description information in accordance with implementations of this disclosure. The path and description information can be collected or recorded by an information collector, such as the information collector 302 of the system 300 of FIG. 3. The path and description information can include information regarding usage of a customer instance by a user via a client device. The flowchart 400 illustrates a system collecting information regarding a first action 402 (ACTION A), a second action 404 (ACTION B), and a third action 406 (ACTION C). The first, second, and third actions 402-406 occur and are collected in a specific order as illustrated in FIG. 4. The information regarding the first, second, and third actions 402-406 can include user commands associated with interfacing with the customer instance via the client device (frontend client-side commands), transaction steps corresponding to the user commands (backend server-side transactions), and any combination thereof.

Additional information regarding each action can also be collected including but not limited to timestamp information and location information. Additional actions not illustrated can be collected and the actions 402-406 and the additional actions can be collected in various predetermined orders. For example, only actions within a predetermined time period before an incident occurs can be collected. Information associated with the first, second, and third actions 402-406 can include but are not limited to user commands such as updating code in a specific area of the customer instance, entering data into a specific text field of the customer instance, and selecting or clicking an element of the customer instance.

In some implementations, after the user takes the third action 406, an incident or issue occurs and the user can be prompted to submit a description via an incident management platform. The incident management platform can be located on the customer instance and in communication with the system 300. In another implementation, the incident management platform is part of the system 300 and is accessed by the user to submit the description. In the flowchart 400, responsive to the issuance or presence of an incident, the user submits the description 408. The description 408 can be manually submitted by the user or can be automatically generated and submitted by a system (such as the system 300 of FIG. 3) based on the actions (e.g., the first, second, third actions 402-406). In addition to the actions 402-406 and the description 408, additional information can be collected and submitted including but not limited to information regarding each of the client device, customer instance, server device, and inputs and selections from various incident lists and incident forms.

Figure 5:
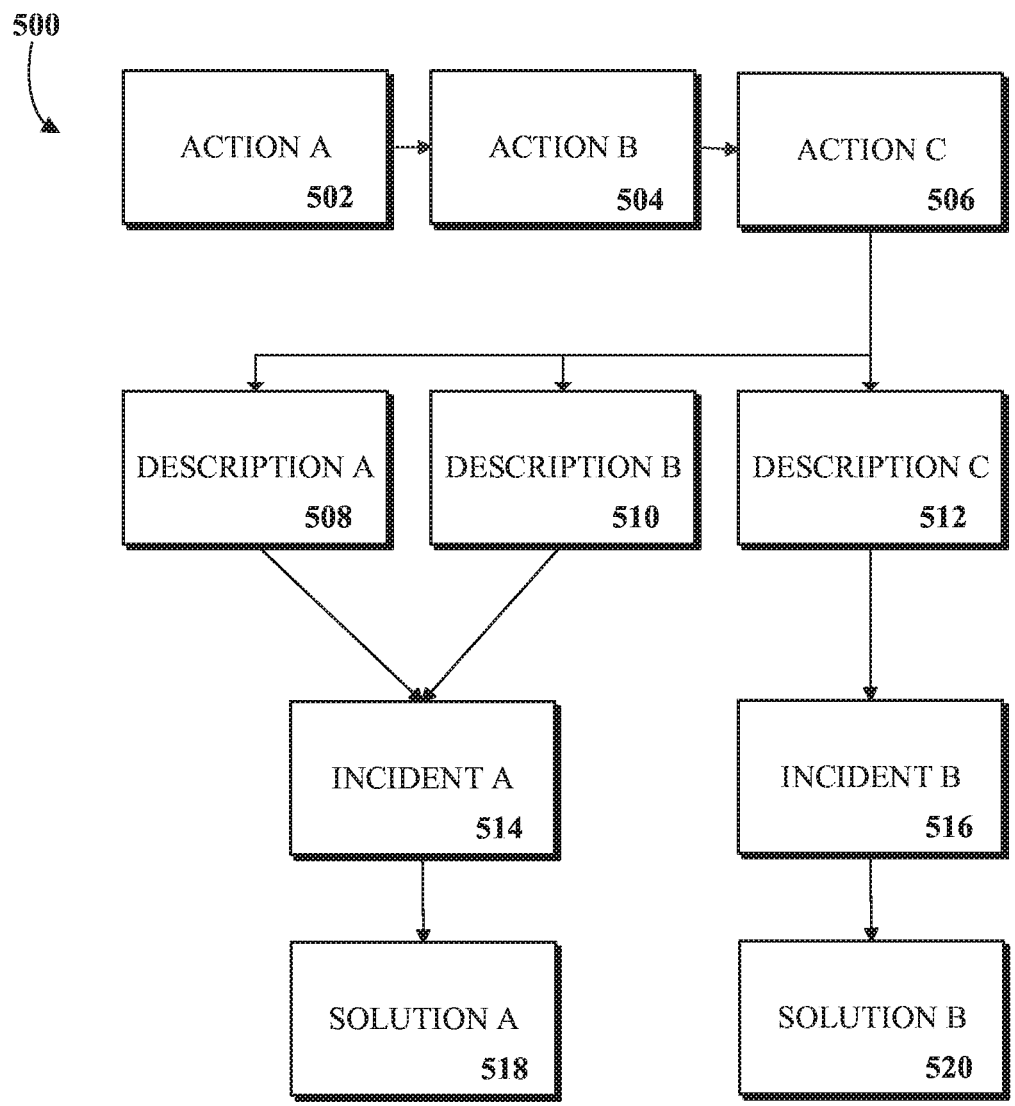
FIG. 5 is a block diagram illustrating an example tree type data structure in accordance with implementations of this disclosure.

After the actions, the description, and any additional information are collected (such as by the information collector 302 of FIG. 3) and submitted, they can be stored in a tree type data structure within a database, such as the database 304 of FIG. 3. FIG. 5 is a block diagram illustrating an example tree type data structure 500 in accordance with implementations of this disclosure. The tree type data structure 500 includes a plurality of pathways as described in greater detail below. In another implementation, a separate tree type data structure can be utilized to store data and information associated with a single pathway. The tree type data structure 500 includes a first type of data comprising path related information such as a first action 502 (ACTION A), a second action 504 (ACTION B), and a third action 506 (ACTION C). The first, second, and third actions 502-506 are similar to the first, second, and third actions 402-406 in FIG. 4. Additional actions and other path related information (e.g., timestamps, location information) can be included in the first type of data of the tree type data structure 500.

After the occurrence of the third action 506, an incident or issue can occur prompting the user or the system to submit an associated description (i.e., a description associated with the actions recorded thus far) to aid in the resolution of the incident or issue. The tree type data structure 500 also includes a second type of data comprising description related information such as a first description 508 (DESCRIPTION A), a second description 510 (DESCRIPTION B), and a third description 512 (DESCRIPTION C). The first, second, and third descriptions 508-512 are each submitted after the occurrence of the third action 506 resulting in differentiated pathways as illustrated by FIG. 5. Specifically, after the third action 506, the first description 508 can be submitted resulting in a first pathway (i.e., a path to pain point) or the second description 510 can be submitted resulting in a second pathway or the third description 512 can be submitted resulting in a third pathway.

In addition to the action and description information, incident data and information related to the incident that occurs can also be submitted (as another type of data) within the tree type data structure 500 (not shown). The incident data can include information regarding the incident that has occurred including but not limited to the type of error that the incident can be tagged with. Each of the first, second, and third descriptions 508-512 are submitted individually and are thus not submitted together. In some implementations, more than one description can be submitted with the associated actions (e.g., user commands, corresponding transaction steps) that resulted in or gave rise to the incident/issue. As aforementioned, the first, second, and third, descriptions 508-512 can be submitted by the user of the customer instance, a third-party remote user, or automatically.

In FIG. 5, the first pathway (inclusive of the first, second, and third actions 502-506 and the first description 508 and optionally other information associated with the incident including but not limited to incident data) results in a first incident 514 being identified. The second pathway (inclusive of the first, second, and third actions 502-506 and the second description 510 and optionally other information associated with the incident including but not limited to incident data) also results in the first incident 514 being identified. Therefore, although the first and the second pathways are different (due to the difference in the first description 508 and the second description 510), they result in the identification of the same incident (namely the first incident 514) based on the collected and submitted information. The third pathway (inclusive of the first, second, and third actions 502-506 and the third description 512 and optionally other information associated with the incident including but not limited to incident data) results in a second incident 516 being identified. Comparatively, in this situation, the third pathway is different from the first and the second pathways and the identified incident is also different (the third pathway is associated with the second incident 516 whereas both the first pathway and the second pathway are associated with the first incident 514).

After an incident is identified or determined, a resolution option associated with the incident is generated by a resolution options module such as the resolution generator 308 of the system 300 of FIG. 3. In FIG. 5, a first resolution option or solution 518 (SOLUTION A), corresponding to the first incident 514, is generated and can be stored in the tree type data structure 500 for future use or optimization of the system; and a second resolution option or solution 520 (SOLUTION B), corresponding to the second incident 516, is generated and can also be stored in the tree type data structure 500. As a result, each pathway (first, second, third) stored in the tree type data structure 500 includes information regarding one of the two incidents (e.g., user commands, transaction steps, descriptions, incident data regarding one of the first incident 514 and the second incident 516) and information regarding one of the two resolution options (e.g., information regarding one of the first solution 518 and the second solution 520).

In some implementations, the type of information that is stored in the tree type data structure such as the tree type data structure 500 of FIG. 5 is predetermined or restricted. For example, only the actions comprising user commands and transaction steps and the descriptions related to a certain incident (i.e., the path to pain point or the pathway that resulted in the incident) can be stored in the tree type data structure. The actions can only include user commands as well and not the corresponding transaction steps. In response to the storage and analysis of the actions and descriptions, an incident can be identified and an associated resolution or solution for that incident can be generated. The resolution that is generated is based on the path taken and description submitted. Therefore, similar paths (i.e., user's taking similar commands resulting in similar actions) can be related to a single incident and a single solution.

Figure 6:
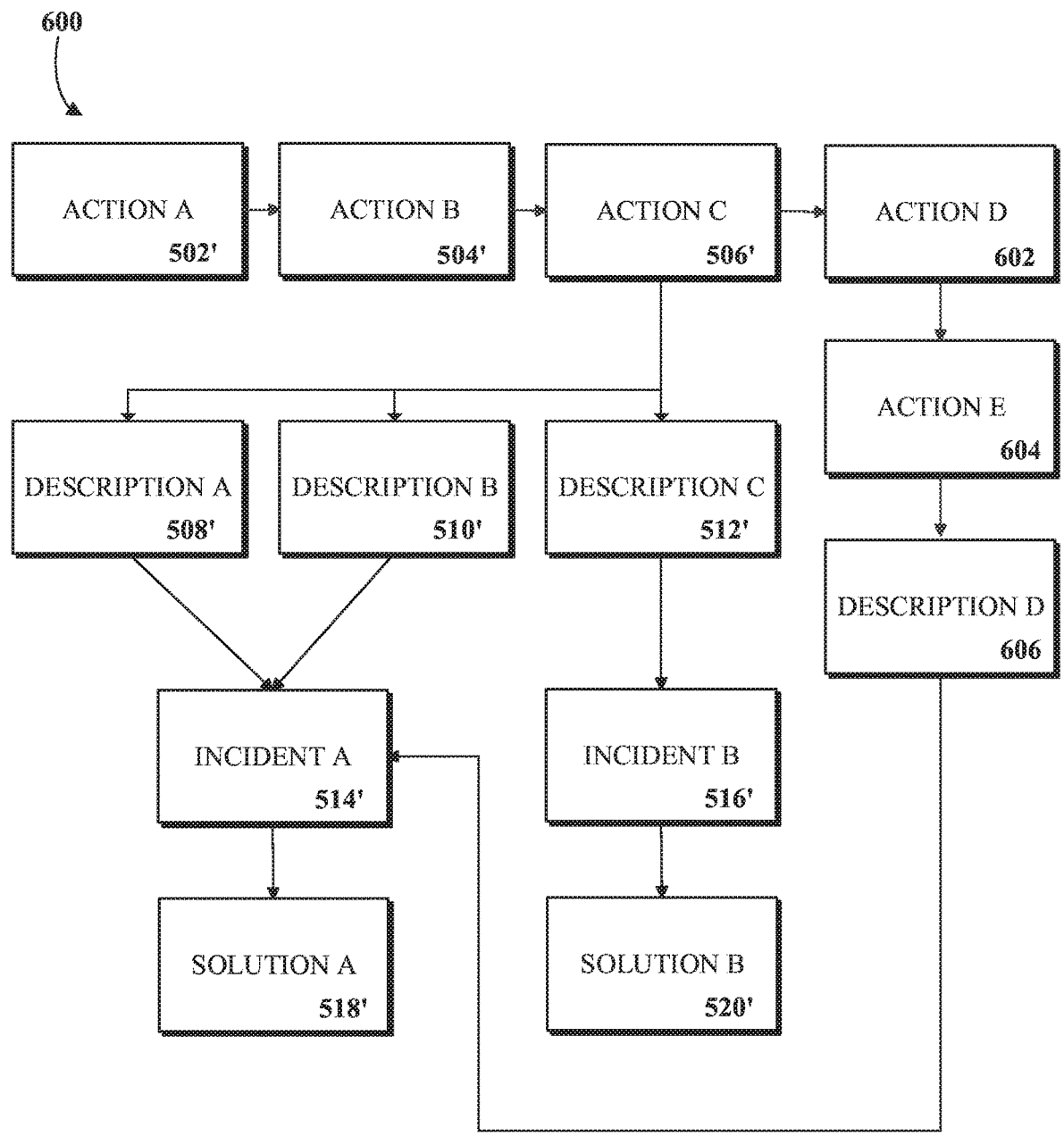
FIG. 6 is a block diagram illustrating an example tree type data structure in accordance with implementations of this disclosure.

FIG. 6 is a block diagram illustrating an example tree type data structure 600 in accordance with implementations of this disclosure. The tree type data structure 600 is similar to the tree type data structure 500 of FIG. 5. Specifically, the first, second, and third actions 502', 504', 506', the first, second, and third descriptions 508', 510', 512', the first and second incidents 514', 516', and the first and second solutions 518', 520' of FIG. 6 are similar to the first, second, and third actions 502-506, the first, second, and third descriptions 508-512, the first and second incidents 514-516, and the first and second solutions 518-520 of FIG. 5. In FIG. 6, a fourth pathway is presented with additional actions in addition to the first, second, and third actions 502'-506') comprising a fourth action 602 (ACTION D) and a fifth action 604 (ACTION E). In addition, a fourth description 606 (DESCRIPTION D) is submitted.

In FIG. 6, the fourth description 606 is determined to be associated with the first incident 514' thereby resulting in the generating of the first solution 518'. Therefore, although additional actions were taken (the fourth and fifth actions 602-604 that can comprise two additional user commands and corresponding transaction steps), the incident related information submitted and resulting pathway can be determined to be similar to another pathway. If pathways are determined to be similar, then similar incidents can be determined and similar associated resolution options can be generated. The determination of similarities between path to pain points or pathways and incident related information (including but not limited to the actions comprising user commands and transaction steps, descriptions, and incident data associated with each incident) can be carried out by a machine learning mechanism or techniques that analyze historical data and current data. The analysis of historical data and current data results in comparative data which can be utilized to determine that different pathways can be resolved by similar solutions. In some implementations, the machine learning techniques can include but are not limited to a logistic regression technique, a support vector machine (SVM) technique, a neural network (NN) technique, a restricted Boltzmann machine (RBM) technique, or any combination thereof.

The machine learning techniques are also utilized to reorganize or update or optimize the tree type data structures that are stored in the database of the system for identifying resolutions. This reorganization enables more optimal resolution options to be generated in response to future incidents based on previous success rates and information collected. The information that is collected and associated with the incident that the customer instance experiences (user commands, communications, associated backend transaction steps, submitted descriptions, other incident data) is continuously utilized to determine similar situations and similar resolution options that could help resolve the incident and avoid the creation of an incident report. In addition, the machine learning techniques can be utilized to deflect potential situations that could arise to the occurrence of an incident. For example, if a user begins to carry out certain commands that the system knows could inevitably lead to the occurrence of an incident if additional actions are taken, the user could be prompted with an alert message and resolution options to resolve or revert back the commands taken to avoid the occurrence of the incident.

In FIG. 6, the first pathway from actions 502' to 504' to 506' to the first description 508' that is associated with the first incident 514', the second pathway from actions 502' to 504' to 506' to the second description 510' that is also associated with the first incident 514', and the fourth pathway from actions 502' to 504' to 506' to 602 to 604 to the fourth description 606 that is also associated with the first incident 514' can all be resolved using the same solution (i.e., the first solution 518'). Comparatively, the third pathway from actions 502' to 504' to 506' to the third description 512' that is associated with the second incident 516' can be resolved using a different solution or the second solution 520'. In another implementation, the fourth pathway (inclusive of the first-fifth actions 502'-506', 602, 604 and the fourth description 606) can be determined to be more similar to the second incident 516' or an incident not shown and in turn associated with the second solution 520' or a solution not shown respectively.

Figure 7:
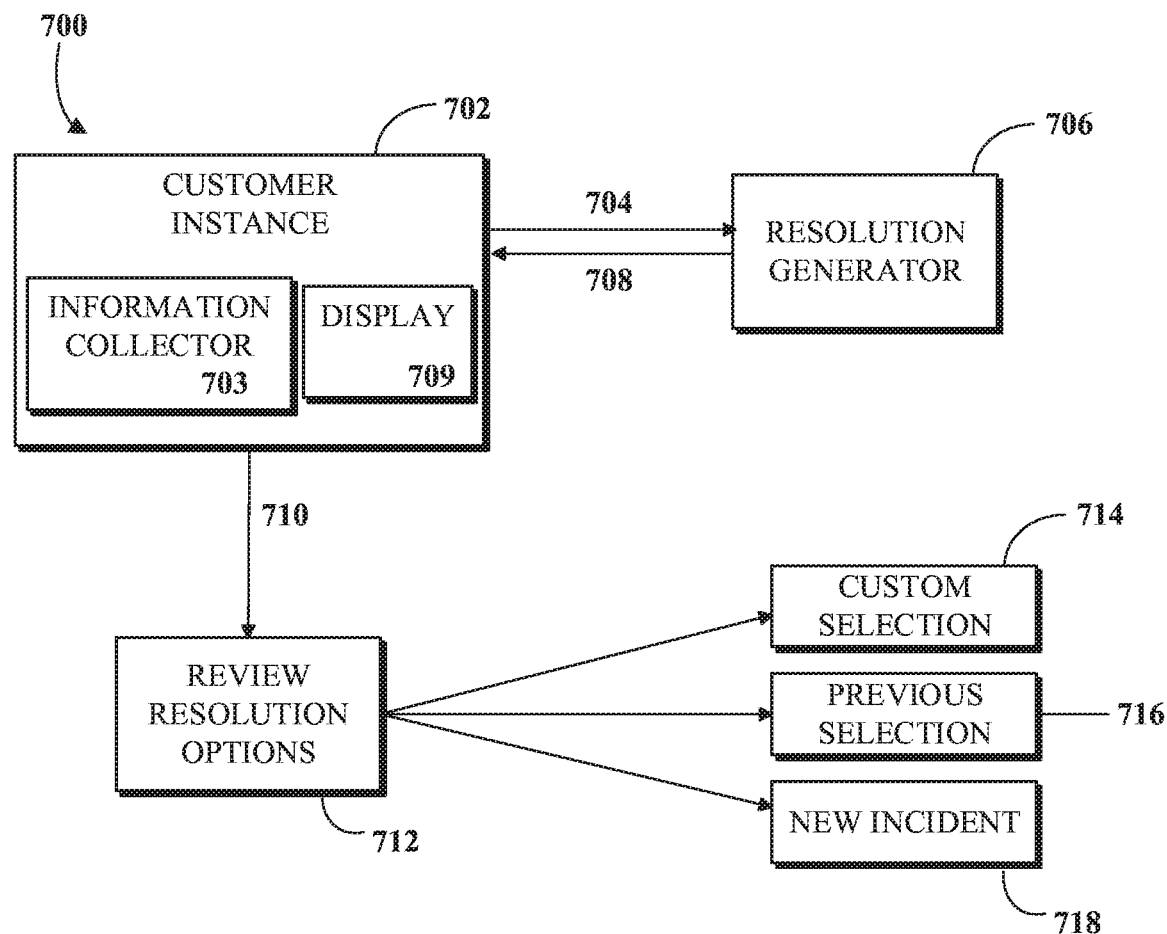
FIG. 7 is a flowchart illustrating an example process for generating a plurality of resolution options in accordance with implementations of this disclosure.

FIG. 7 is a flowchart illustrating an example process 700 for generating a plurality of resolution options in accordance with implementations of this disclosure. The process 700 begins with the recording of actions (e.g., client-side user commands interfacing with the customer instance 702 including but not limited to clicking a button on an interface of the customer instance and server-side transaction steps including but not limited to programmatic information associated with the clicking of the button) associated with a customer instance 702 that result in the occurrence of an incident. The customer instance 702 can include an information collector 703 (such as the information collector 302 of FIG. 3) and a display 709 (such as the display 310 of FIG. 3). The information recorded can include actions comprising user commands and corresponding transaction steps via the information collector 703.

In some implementations, the recording of the actions is initiated by the customer instance 702 in response to a request received from a client device associated with the customer instance 702, a request received from another system (e.g., third-party administrator monitoring the customer instance 702), or a request to continuously and automatically monitor all actions taken in association with the customer instance 702 (e.g., the client device or the server device could select or provide a request to turn on the continuous monitoring feature of the information collector 703). If the continuous monitoring feature is selected, the recording of actions can comprise the information collector 703 of the customer instance 702 continuously recording a plurality of actions, an indication of an incident being received by the customer instance 702, and an identification of a series of actions of the continuously recorded plurality of actions. The information recorded from the continuous monitoring (e.g., actions comprising user commands and backend transaction steps) can be stored within a limited storage device so that the information recorded is only stored for a predetermined time period.

Once an incident is determined to occur (e.g., including but not limited to an alert message being received by the user or if the customer instance 702 is no longer functioning properly as determined using various data analytics), the data and information associated with the customer instance 702 that has been recorded and stored (e.g., stored in a database such as the database 304 of FIG. 3) is transmitted, via 704, to a resolution generator 706 such as the resolution generator 308 of FIG. 3. In some implementations, the information is transmitted to another system or incident management tool (e.g., an ITSM system) for the analysis and generation of at least one resolution option.

Data can be generated in response to the receiving the path to pain point information (e.g., user commands, corresponding transaction steps, etc.) and can be transmitted back to the customer instance 702 that experienced the incident, via 708. The data transmitted back can include a customization check that compares a baseline version of an application/instance to the customer instance and determines various customizations that have been implemented that could be the source of the incident or issue experienced. Once the data is received by the customer instance 702, the options can be displayed on the display 709 and are reviewed (e.g., by a client device associated with the customer instance 702 or a third-party administrator monitoring the customer instance 702), via 712, and a selection is made. The selection can include but is not limited to a customized resolution option 714 that has been determined based on the information submitted and a previously successful resolution option 716 (e.g., a resolution option that resolved a similar incident in the past and that is determined based on the pathway information and the incident data). If a resolution option isn't provided, an incident report can be submitted and the incident is flagged or marked as a new incident 718. The incident report that is submitted can include the data and information associated with the customer instance 702 that has been tracked and recorded (e.g., user commands, server device transaction steps, incident date, etc.) and any resolution options suggestions.

In some implementations, data associated with a plurality of instances across various customers are tracked, recorded, and stored within a shared cloud computing database that is utilized to improve upon the resolution generation and incident management system. The data and information that is tracked and collected and that is associated with an incident experienced by a customer instance can be utilized to resolve the incident and also to deflect the incident. The steps to reproduce (tracking user commands including but not limited to user interface interactions including but not limited to click throughs and other associated information including but not limited to backend transaction steps) and description submitted can be utilized to return similar incidents previously experienced by the same customer instance (or by other customer instances) and resolution options that resolved the incidents. The system for identifying resolutions can also run a background check on security access control lists (ACLs) and the element selected dictionary and sys_object tables, provide logs of information, conduct machine learning techniques to ensure the resolution options and other returned information is accurate and up to date, and conduct comparisons between baseline and customized instances to aid in the resolution of the incidents (or the generation of resolution options).

In some implementations, the information collected and associated with the steps to reproduce include but are not limited to user commands including but not limited to user interface interactions (i.e., interactions between a user and the client device that is in communication with the instance), backend transaction steps associated with the user commands, descriptions, the entire set of paths or path to pain points, sys_id of various elements, sys_dictionary ID and sys_db object information, log information beginning with a first transaction in a series of transactions, and additional information that may be beneficial to collect and store for analysis and for the determination or generation of a resolution option to help resolve the incident. The log information can include but is not limited to data associated with the incident or issue experienced, previous incidents or issues, the customer instance, tracked and recorded information, resolution options, time and location specific information, and information regarding the communications between the client and server devices.

The system for identifying resolutions such as the system 300 of FIG. 3 can also be utilized to provide automated incident classification before the incidents are analyzed or transmitted to an incident resolution team. The incidents can be classified in accordance with various types of data and information including but not limited to actions (e.g., user commands, transaction steps, etc.) associated with interfacing with the customer instance, service catalog, knowledge base, project, catalog item, record producer, checkout, one step, two step, ordering, workflow, and business rule information. In addition to automated incident classification, the system can provide various other improvements including but not limited to decreasing the time to resolve (TTR), improving the searching capabilities for clients/customers and technical support engineers, deflection tracking, data organization via structured data, data optimization for accurate machine learning technique utilization, analytics and metric information including but not limited to how instances are being utilized, the various incidents or issues being experienced, and the success of the generated/suggested resolution options.

The system for identifying resolutions via path to pain points may be utilized by a variety of different types of client devices, users, customers, and instances. The path to pain points and associated incidents or issues experienced by a customer instance can be recorded using logs that include log information from the customer instance being tracked, the client device interfacing with the customer instance, and the server device that is in communication with the client device. The data and information that is collected (such as by the information collector 703 of the customer instance 702) can be transmitted to a system (such as the system 300 of FIG. 3) that collects and stores and analyzes the data. The data is stored using specific data structures including but not limited to tree type data structures and the pathways or path to pain points associated with each incident. After organization of the data into the tree type data structure (or a similar data structure), the system utilizes machine learning techniques to learn from the data thereby enabling storage of the path to pain point data in optimized locations associated with resolution options (e.g., knowledge base articles or KB articles). By optimizing and reorganizing the tree structure, the information and resolution options associated various incidents can be more readily returned.

For example, a customer instance can be tracking and collecting the information in the background via an information collector such as the information collector 302 of the system 300 of FIG. 3 or the information collector 703 of the customer instance 702 of FIG. 7. Once an incident/issue/error is determined based on an analysis of the logs and the data/information stored within the logs (e.g., information associated with user commands leading up to the occurrence of the incident), the logs and stored information can be utilized to provide suggested resolution options or KB articles. If the client needs additional help, the steps to reproduce the incident and path to pain point information that has been recorded can be submitted along with a potential incident report to enable a remote administrator to help resolve the incident. If a matching path to pain point is found, a resolution option or solution utilized previously for the matching path to pain point (and associated incident) can be provided to aid in the resolution of the current incident.

In some implementations, the customer instance, the information collector of the customer instance, or the client device could include a recording button where all user commands are tracked if the recording button is activated. For example, a user of the customer instance (e.g., a user using a client device interfacing with the customer instance) can activate the recording button or a third-party administrator that is monitoring the customer instance can activate the recording button. The recordation can be set for a variety of time periods including but not limited to a predetermined time period associated with when an incident occurs (e.g., user commands are recorded for 5 minutes before and after an incident occurs) and can be set to be automated and continuous until the recording button is deactivated. Once an incident is experienced or determined to be forthcoming, a pop up alert can be provided to show the user of the client device the steps taken (e.g., user commands, corresponding backend transaction steps, and any combination thereof), the incident/issue/error, and a list of potential or suggested resolution options (e.g., KB articles) to help fix the issue. In some implementations, a connection tool can be provided as a helper that provides an alert message to the client device once an incident or issue has been detected. The client device can then be prompted to try and resolve the issue on their own, submit the path to pain point information tracked and recorded in the background, or open up an incident report that can include the recorded path to pain point information.

The client device can also be automatically provided with any resolution options or solutions generated without requiring any submission of information. In this automated environment, the path to pain point information (e.g., user commands, corresponding transaction steps, incident data, descriptions, etc.) that is tracked and recorded in the background by an information collector (such as the information collector 302 of FIG. 3) can be automatically transmitted to a resolution generator (such as the resolution generator 308 of FIG. 3) and any potential resolution options that are determined or generated because of similarities in the data (e.g., similarities between the path to pain point data structure submitted and previous data structures submitted) can be automatically transmitted back to the client device. In addition, the resolution options can be automatically applied to help resolve the incident automatically without requiring intervention by an operator of the client device.

In some implementations, in addition to the resolution options that are transmitted back to the client device, additional information including but not limited to links, articles, and video instructions can be transmitted to enable an operator of the client device to implement the resolution options without any third-party assistance if the resolution options cannot be automatically applied.

For example, the addition of certain code to customize an aspect or module of the customer instance could result in a certain incident. The addition of the code could be flagged as the user command that led to the incident and would be included in the path to pain point data structure. The path to pain point data structure can also include backend transaction steps that correspond to the user command or addition of the code. Similarly added code on the same customer instance or other customer instances can be determined to have led to similar incidents with the resolution of the incident being the removal of the code. In this situation, the resolution option could thus be determined to be the removal of the code in question and this resolution option could be automatically implemented. For example, once the system determines that the added code has caused the incident and that previous similar incidents were resolved by removing the added code, the added code in question could then be automatically removed or deleted without any need for input by the client device. In conjunction with the removal of the code, an instruction message can be sent to the client device stating that the resolution option (i.e., code removal) was automatically implemented. The resolution option of deleting the code can also be transmitted to the client device for removal by the client device.

In some implementations, the system for identifying resolutions can be controlled by the client device via various modes including but not limited to an on mode, off mode, constant or continuous logging mode (that might only be activated when the system performance is high), momentary logging mode (that might only be activated when the system detects that the client device and customer instance is not performing as optimally as it should), an open logging mode (where all of the data/information is tracked and openly shared with a cloud computing database that enables the system to be improved upon), and a selected information logging mode (where only a subset of the data/information is tracked based on privacy requirements or concerns). These modes can be activated by the recording button or a similar mechanism.

Figure 8:
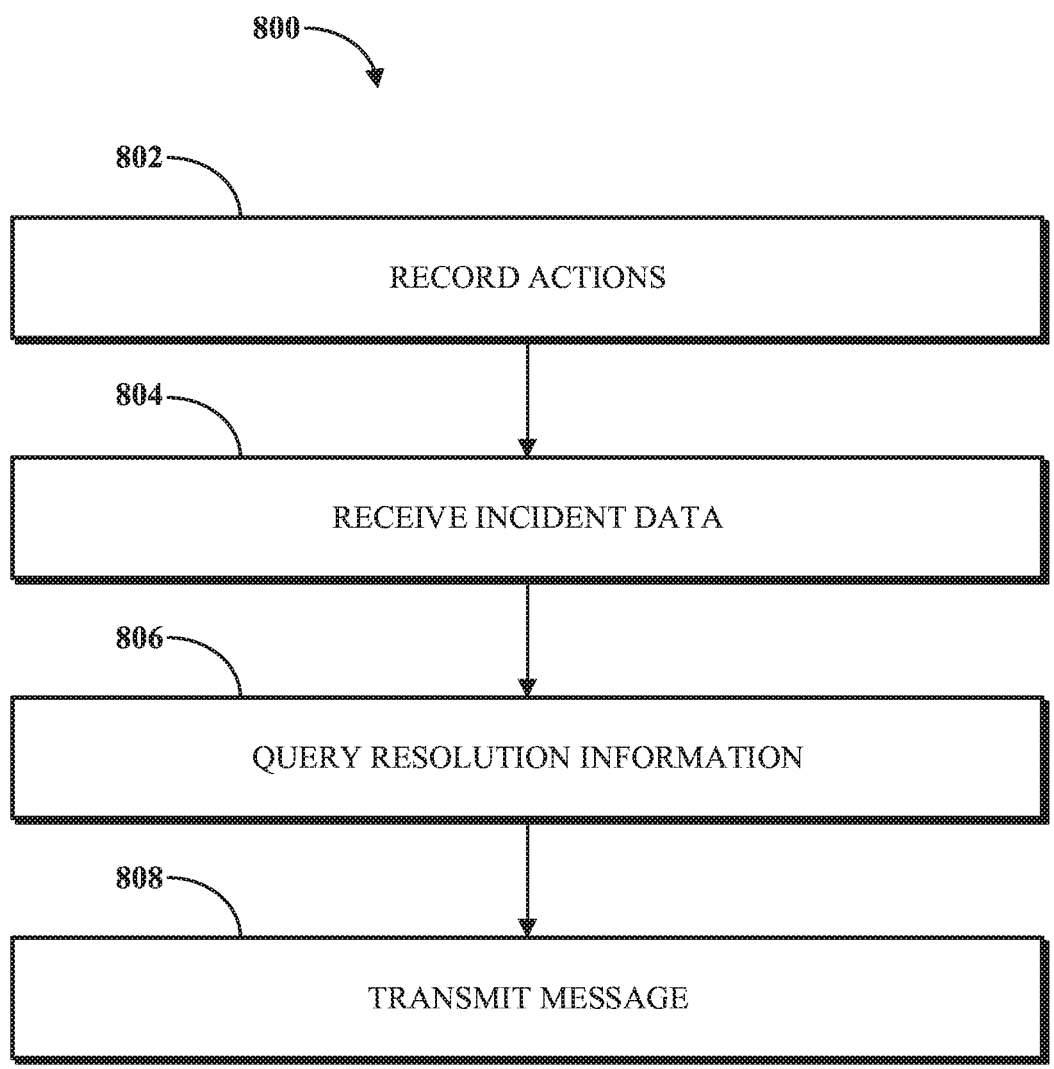
FIG. 8 is a flowchart illustrating an example of a technique for identifying resolutions in accordance with implementations of this disclosure.

FIG. 8 is a flowchart illustrating an example of a technique 800 for identifying resolutions in accordance with implementations of this disclosure. The technique 800 includes recording actions, via 802, receiving incident data, via 804, querying resolution information, via 806, and transmitting a message, via 808. The technique 800 can be executed using computing devices, such as the systems, modules, and devices described with respect to FIGS. 1-3. The technique 800 can be performed, for example, by executing a machine-readable program or other computer-executable instructions, such as instructions or programs described according to JavaScript, C, or other such instructions. The steps, or operations, of the technique 800 or any other technique, method, process, or algorithm described in connection with the implementations disclosed herein can be implemented directly in hardware, firmware, software executed by hardware, circuitry, or a combination thereof.

The recorded actions can be associated with a user's commands taken with respect to a customer instance on a cloud computing infrastructure. The recorded actions can include the backend server-side transaction steps that correspond to the user's commands. For example, the user's commands can include but are not limited to adding code to a certain module of the customer instance, changing or updating various pieces of data and information, and navigating through the customer instance by selecting various dropdowns and menu items. In response to the user's commands, an incident may occur that provides an indication of the incident (e.g., an error message) that can state an aspect of the customer instance is no longer operative or fully functional after a certain piece of code had been added. In addition to receiving the recorded series of actions, incident data associated with the incident can be received or determined (e.g., error type(s) associated with the incident). Based upon the receiving the recorded path to pain point information (including but not limited to the series of actions, incident data, etc.), a database (such as the database 304 of FIG. 3) can be queried for various potential resolution information and options to help resolve the experienced incident. Once the appropriate resolution information and options are identified, a message can be transmitted with this information so that the resolution options or recommendations can be applied to address or resolve the incident.

Figure 9:
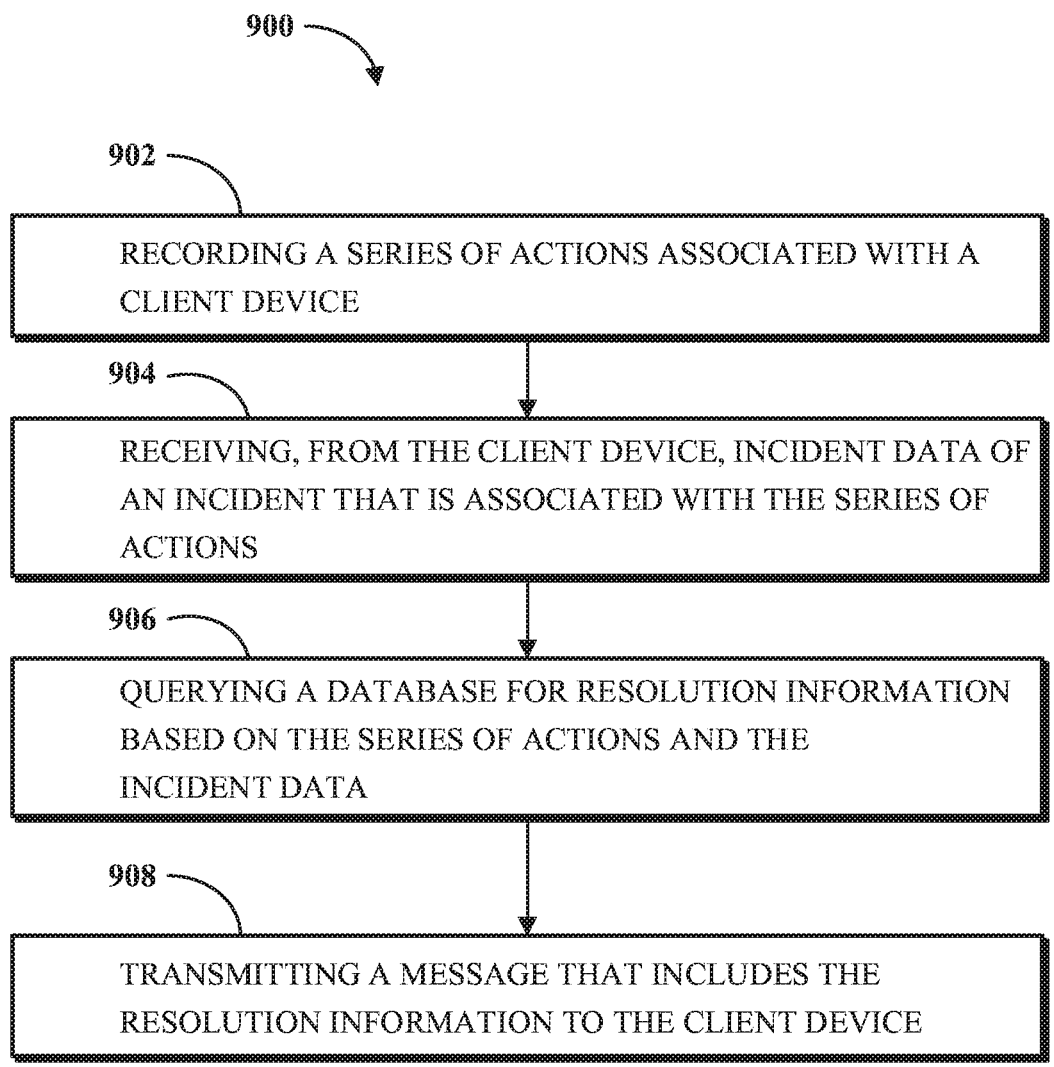
FIG. 9 is a flowchart illustrating an example of a technique for identifying resolutions in accordance with implementations of this disclosure.

FIG. 9 is a flowchart illustrating an example of a technique 900 for identifying resolutions in accordance with implementations of this disclosure. The technique 900 can be executed using computing devices, such as the systems, modules, and devices described with respect to FIGS. 1-3. The technique 900 can be performed, for example, by executing a machine-readable program or other computer-executable instructions, such as instructions or programs described according to JavaScript, C, or other such instructions. The steps, or operations, of the technique 900 or any other technique, method, process, or algorithm described in connection with the implementations disclosed herein can be implemented directly in hardware, firmware, software executed by hardware, circuitry, or a combination thereof.

The technique 900 for identifying resolutions can identify resolutions within a system including but not limited to an instance of platform software in a single-tenant or multi-instance cloud computing infrastructure or platform. The technique 900 includes recording a series of actions associated with a client device, via step 902, receiving, from the client device, incident data of an incident that is associated with the series of actions, via step 904, querying a database for resolution information based on the series of actions and the incident data, via step 906, and transmitting a message that includes the resolution information to the client device, via step 908.

In some implementations, the series of actions includes any of one or more commands of the client device (e.g., user commands or user interface interactions taken by the client device that is in communication with the customer instance), one or more communications between the client device and the customer instance, and one or more corresponding transaction steps of the server device, further wherein the user interface interactions include but are not limited to click throughs. The incident data can include an object identifier and a description of the incident, further wherein the incident can be caused by interaction with an object associated with the object identifier. The incident data can also include the type of error that the incident can be tagged or labeled with. The resolution information can include historical information indicating how other incidents related to the incident have been previously resolved. The resolution information can further include a list of similar resolutions associated with the incident. The technique 900 can include storing the series of transaction steps and the incident data in a tree type structure in the database and updating or re-organizing the tree type structure using a machine learning mechanism.

The technique 900 can include receiving a request from the client device to initiate the recording of the series of actions. The request from the client device can be for recording the series of actions for a predetermined time period or for a continuous time period. In some implementations, the recording of the series of actions associated with the client device comprises continuously recording actions associated with the client device, receiving an indication of the incident, and identifying the series of actions from the continuously recorded actions. For example, the series of actions can be identified by monitoring system performance and detecting low performance level time periods prior to the occurrence of the incident. After the resolution information is transmitted to the client device, the series of actions, incident data, and other information associated with the incident can be submitted via an incident report that is created for further resolution of the incident.

In some implementations, a system for resolving incidents experienced by a customer instance is provided by the present disclosure. The system provides for recording a series of actions (e.g., user commands, transaction steps, etc.) associated with the customer instance. Responsive to a new incident or issue (i.e., a latest issue experienced by the customer or client device during usage of the customer instance), the system provides for receiving information related to the incident including but not limited to the recorded actions, the incident data comprising an object identifier, and a submitted description from the client device. The incident can be caused by interaction (e.g., from the client device) with an object associated with the object identifier of the customer instance. The system further provides for querying a database for resolution information or resolution options that indicate how one or more other incidents related to the new incident were previously resolved or solved based on respective actions of the series of actions associated with the new incident. The relation between incidents is determined by comparing the series of actions and additional information associated with the new incident to other actions and information associated with the one or more other incidents. The system further provides for transmitting a message including the resolution information to the client device, such that the new incident is resolvable using the resolution information.

In some implementations, the system starts recording the series of actions and additional information associated with the path to pain point process in response to receiving a request. The request can be an initiation request such as the client device submitting a request for initiating the path to pain point process immediately or scheduling the initiation at a predetermined time period. The request can also be a request submitted by either the client device or another system (e.g., an administrator of the server device) that requests automated and continuous recording (e.g., the client device or an administrator of the ITSM system selecting or providing an instruction that they would like the customer instance to be automatically and continuously monitored with all actions and related information recorded over a predetermined time period or recorded indefinitely until the selection is turned off). In addition, the system further provides for the opening of an incident report in an ITSM system that includes the data and information associated with the path to pain point process.

In some implementations, a system in accordance with the present disclosure includes means for recording a series of actions associated with a client device; means for receiving, from the client device, incident data of an incident that is associated with the series of actions; means for querying a database for resolution information based on the series of actions and the incident data; and means for transmitting a message that includes the resolution information to the client device.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for identifying resolutions, the system comprising:
   a server device including a memory, a processor, and a network interface, wherein the memory includes instructions executable by the processor to cause the system to:
   receive, prior to detection of an incident, a request from a client device to initiate recording of a series of actions taken by the client device;
   receive, from the client device, a record of the series of actions taken by the client device, wherein the series of actions precedes the incident;
   receive, from the client device, incident data associated with the incident;
   prior to determining whether to register the incident in an incident management system, query a database for resolution information based on the series of actions and the incident data;
   identify one or more resolution options to resolve the incident based on the resolution information; and
   transmit a message to the client device, wherein the message includes the one or more resolution options to resolve the incident and an option to create an incident report to register the incident as a new incident in the incident management system.

2. The system of claim 1, wherein the incident data includes an object identifier associated with an object and a description of the incident, wherein the incident is caused by interaction with the object.

3. The system of claim 1, wherein the resolution information includes historical information indicating how other incidents related to the incident and preceding the incident have been previously resolved, wherein at least one of the one or more resolution options includes a previously suggested resolution option identified as having successfully resolved at least one of the other incidents.

4. The system of claim 1, wherein the memory further includes instructions executable by the processor to cause the system to:
   store the record of the series of actions, the incident data, and the resolution information in a tree type structure in the database.

5. The system of claim 4, wherein the memory further includes instructions executable by the processor to cause the system to:
   update the tree type structure using a machine learning mechanism, wherein the machine learning mechanism is configured to modify the resolution information based on analysis of historical data, and wherein the historical data includes previous resolution options having resolved other incidents preceding the incident.

6. The system of claim 1, wherein the series of actions includes one or more commands transmitted by the client device to the server device and one or more corresponding transaction steps performed by the server device, wherein the one or more commands comprises a set of user inputs provided via a user interface.

7. The system of claim 1, wherein the memory further includes instructions executable by the processor to cause the system to:
   create the incident report upon receiving an indication that the one or more resolution options are unsatisfactory for resolution of the incident, wherein the incident report includes the series of actions and the incident data.

8. The system of claim 1, wherein the memory further includes instructions executable by the processor to cause the system to:
   automatically apply one of the resolution options to resolve the incident without input from a user of the client device.

9. A method for identifying resolutions, the method comprising:
   initiating recording of a series of actions taken by a client device upon determining that a performance of the client device deviates from an expected performance of the client device;
   receiving, from the client device, a record of the series of actions taken by the client device, wherein the series of actions precedes an incident;
   receiving, from the client device, incident data associated with the incident;
   prior to determining whether to register the incident in an incident management system, querying a database for resolution information based on the series of actions and the incident data;
   identifying one or more resolution options to resolve the incident based on the resolution information; and
   transmitting a message to the client device, wherein the message includes the one or more resolution options to resolve the incident and an option to create an incident report to register the incident as a new incident in the incident management system.

10. The method of claim 9, further comprising:
    storing the record of the series of actions, the incident data, and the resolution information in a tree type structure in the database; and
    updating the tree type structure using a machine learning mechanism.

11. The method of claim 9, further comprising:
    classifying the incident with an incident classification based on the record of the series of actions, the incident data, or both; and
    transmitting the incident classification to the client device or to an incident resolution team.

12. The method of claim 9, further comprising:
    identifying additional resolution information relating to the one or more resolution options, wherein the additional resolution information includes one or more articles, one or more video instructions, or both, identified as relevant to the incident; and
    transmitting the additional resolution information to the client device to facilitate implementation of the one or more resolution options by a user.

13. The method of claim 9, further comprising, prior to receiving the record of the series of actions from the client device:
    recording a subset of the series of actions taken by the client device based on privacy specifications, wherein the privacy specifications are previously specified by a user of the client device.

14. A non-transitory computer-readable storage medium for identifying resolutions, wherein the non-transitory computer-readable storage medium includes executable instructions that, when executed by a processor, facilitate performance of operations, the operations comprising:
    receiving, from a client device, a mode selection specifying one or more recording modes for recording a series of actions taken by the client device, wherein the one or more recording modes include at least one of a continuous logging mode, a momentary logging mode, an open logging mode, or a selected information logging mode;
    recording the series of actions in accordance with the one or more recording modes;
    receiving, from the client device, a record of the series of actions taken by the client device, wherein the series of actions precedes an incident;
    receiving, from the client device, incident data associated with the incident;
    prior to determining whether to register the incident in an incident management system, querying a database for resolution information based on the series of actions and the incident data;
    identifying one or more resolution options to resolve the incident based on the resolution information; and
    transmitting a message to the client device, wherein the message includes the one or more resolution options to resolve the incident and an option to create an incident report to register the incident as a new incident in the incident management system.

15. The non-transitory computer-readable storage medium of claim 14, wherein the resolution information includes historical information indicating how other incidents related to the incident and preceding the incident have been previously resolved, wherein at least one of the one or more resolution options includes a previously suggested resolution option having successfully resolved the other incidents.

16. A system for identifying resolutions, the system comprising:
    a server device including a memory, a processor, and a network interface, wherein the memory includes instructions executable by the processor to cause the system to:
        receive, from a client device, a record of a series of actions taken by the client device, wherein the series of actions precedes an incident;
        receive, from the client device, incident data associated with the incident;

prior to determining whether to register the incident in an incident management system, query a database for resolution information based on the series of actions and the incident data;

identify one or more resolution options to resolve the incident based on the resolution information, wherein the one or more resolution options include a plurality of resolution options, wherein the plurality of resolution options includes a previously suggested resolution option indicated as having successfully resolved a previous incident related to the incident and a customized resolution option generated based on the incident; and transmit a message to the client device, wherein the message includes the one or more resolution options to resolve the incident and an option to create an incident report to register the incident as a new incident in the incident management system.

17. A system for identifying resolutions, the system comprising:

a server device including a memory, a processor, and a network interface, wherein the memory includes instructions executable by the processor to cause the system to:

receive, from a client device, a record of a series of actions taken by the client device, wherein the series of actions precedes an incident;

query a database, preceding occurrence of the incident, to identify a previous incident that is related to the series of actions;

transmit an alert message to the client device upon identification of the previous incident, wherein the alert message includes a predicted resolution option aimed to preclude occurrence of the incident;

receive, from the client device, incident data associated with the incident;

prior to determining whether to register the incident in an incident management system, query the database for resolution information based on the series of actions and the incident data;

identify one or more resolution options to resolve the incident based on the resolution information; and transmit a message to the client device, wherein the message includes the one or more resolution options to resolve the incident and an option to create an incident report to register the incident as a new incident in the incident management system.

* * * * *